United States Patent Office 3,422,035
Patented Jan. 14, 1969

3,422,035
PROCESS FOR POLYMERIZING CYCLIC ACETALS
Herbert May, Oldbury, near Birmingham, Brian John Kendall-Smith, Birmingham, and Susannah Burr, Camargue, Welland, England, assignors to British Industrial Plastics Limited, Manchester, England, a corporation of the United Kingdom
No Drawing. Filed Aug. 27, 1965, Ser. No. 483,337
Claims priority, application Great Britain, July 23, 1965, 30,330/64
U.S. Cl. 260—2                                    22 Claims
Int. Cl. C08g 1/18

ABSTRACT OF THE DISCLOSURE

A cyclic acetal is polymerized under substantially anhydrous conditions in the presence of a catalyst which is an iodonium, substituted iodonium, nitryl or nitrosyl hexafluoroantimonate.

---

This invention relates to polymers and is especially concerned with a process for the polymerisation of cyclic acetals, i.e., compounds having a ring system wherein there is contained at least one

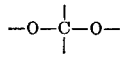

grouping.

According to the present invention a process for polymerising a cyclic acetal comprises effecting the polymerisation in the presence of a catalytic amount of an iodonium, substituted iodonium, nitryl or nitrosyl hexafluoroantimonate.

The term "polymerising" as used herein is intended to include homopolymerisation of the cyclic acetals, copolymerisation of the cyclic acetals with one or more other cyclic acetals, and copolymerisation of the cyclic acetals with one or more other copolymerisable compounds.

Typical cyclic acetals which may be polymerised according to the invention include trioxan, tetroxan, 1,3-dioxolan, 1,3,5 - trioxepan and 1,3-dioxepan. They may be copolymerised with each other and with such other polymerisable compounds as styrene and styrene derivatives, aldehydes, allyl compounds, cyclic esters, unsaturated aliphatic hydrocarbons, vinyl ethers and esters, and N-vinyl and C-vinyl heterocyclic compounds. Suitable such copolymerisable compounds include styrene, α-methyl styrene, α-phenyl styrene, o-, m- and p-methyl styrenes, anethole, 1-vinyl naphthalene, 2-vinyl naphthalene, stilbene, indene, coumarone, acenaphthylene; chloral, benzaldehyde, anisaldehyde, cinnamaldehyde, piperonal, butyraldehyde; allyl acetate, allyl ethyl ether, allyl bromide, allyl methacrylate, allyl Cellosolve, allyl cyanide, allyl benzene, allyl glycidyl ether, allyl alcohol, allyl beta-cyclohexyl propionate, allyl phenyl ether, diallyl phenyl phosphate; beta-propiolactone, delta-valerolactone, epsilon-caprolactone, trichlorethylidene lactate, methylene glycollate, lactide, ethylene oxalate, dioxanone; isobutene, butadiene, isoprene, pentadiene-1,3, cyclohexene, heptene-1, octene-1, cyclopentadiene, 4-vinyl cyclohexane, betapinene; methyl vinyl ether, ethyl vinyl ether, n-butyl ether, isobutyl vinyl ether, vinyl 2-ethyl hexyl ether, phenyl vinyl ether; vinyl acetate; N-vinyl carbazole, 2-vinyl pyridine and 2 - vinyl-1,3-dioxan. Normally these other comonomers will make up between 0.01 and 50% of the units of the polymer, preferably between 0.1 and 20%.

The process is preferably carried out with the minimum of moisture and suitably under anhydrous conditions. It may be conducted under bulk conditions or it may be of advantage to conduct the polymerisation in an inert liquid medium which may be a solvent or nonsolvent for the monomers under the polymerisation conditions. Suitable solvents include saturated aliphatic and cycloaliphatic hydrocarbons, chlorinated aliphatic and cycloaliphatic hydrocarbons, and aliphatic and aromatic nitro hydrocarbons. Cyclohexane is particularly suitable. It is often convenient to add the catalyst in the form of a solution, for example in an aliphatic nitrohydrocarbon such as nitroethane or nitropropane.

The purity of the reactants is particularly emphasised and adequate purification procedures must be adopted to ensure the substantial absence of impurities. Normally efficient distillation procedures, for example, may be adequate but such procedures may be supplemented by distillation over compounds which neutralise or react with known impurities to give inert, nonvolatile or easily removed reaction products.

The temperature of the reaction may vary widely, depending on the reactants, solvent and so on but will usually be between −100° and +150° C., preferably between −20° and +100° C. The reaction may, if desired, be effected under a dry inert atmosphere, such as nitrogen. In some cases it is suitable to use superatmospheric pressure.

The catalysts of the present invention can readily be removed from the formed polymer by suitable procedures, such as washing, milling or agitating the polymer with solvents for the catalysts, neutralising agents or complexing agents for the catalysts. It is particularly effective to remove the catalyst by treatment with a basic substance such as an amine or ammonia. The polymer is then thoroughly washed after such treatment to remove all residues and dried.

There may be incorporated into the polymers formed by the process of the present invention stabilisers, antioxidants, pigments, ultra-violet light absorbers and similar materials commonly used as additives to polymeric compositions. The polymers may also, if desired, be stabilised by treating them with compounds which react with any free end groups. For instance, they may be acetylated at the end-groups by reaction with acetic acid or acetic anhydride.

It is already known to polymerise trioxan, both with and without a copolymerisable monomer, and to polymerise certain other cyclic acetals in the presence of an electrophilic catalyst, such as boron trifluoride, certain of its complexes, stannic chloride, ferric chloride, certain other inorganic fluorides and oxonium salts. We have found that the catalysts of the present invention, when applied to the polymerisation of cyclic acetals, have certain advantages over the catalyst used hitherto; for example, in the polymerisation of trioxan, the polymerisation rate is much higher and a larger percentage yield of polymer is obtained compared with known catalysts. Furthermore a trioxan-styrene copolymer produced by the method of the invention had a molecular weight more than three times the molecular weight of trioxan-styrene copolymers produced using as catalysts an oxonium fluoroborate or boron trifluoride.

The polymers produced in accordance with this invention are especially useful for compression, injection and extrusion mouldings.

The following examples are given for the purpose of illustrating the invention. In these examples the inherent viscosity has been determined on a 0.5% solution of the polymer in p-chlorophenol containing α-pinene as stabiliser.

EXAMPLE 1

A reaction vessel was charged with 50 g. trioxan (freshly distilled over stearylamine and calcium hydride), 100 g. cyclohexane and 1.5 ml. vinyl acetate. The mixture was maintained at 60° C. and stirred vigorously. 0.003 g. nitryl hexafluoroantimonate (as a 25% solution in nitroethane) was injected into the mixture, whereupon polymerisation rapidly ensued. After 3 minutes the reaction was terminated by the addition of a small amount of acetone and the product was slurried and homogenised by high speed agitation with a larger amount of acetone and filtered. The filter cake was slurried and stirred with 1% aqueous ammonia at 85° C. for 15 minutes, homogenised with water and acetone and dried in a vacuum oven at 50° C. The conversion to polymer was 52% theoretical.

EXAMPLE 2

A similar experiment to that described in Example 1 was carried out except that 1.5 ml. styrene was used instead of the vinyl acetate, and the polymerisation time was 1 hour.

EXAMPLE 3

To a vigorously agitated mixture of 230 g. substantially anhydrous trioxan and 230 g. anhydrous cyclohexane at 60° C. were added 6.9 g. styrene followed by 0.12 g. iodonium hexafluoroantimonate as a 2% solution in 1-nitropropane. Polymerisation occurred immediately and a white polymer precipitated from the solution during the reaction period of 3 hours at 60° C. The reaction product was isolated by treating the reaction mixture with 15 ml. triethylamine solution in 100 ml. acetone, followed by filtration. After washing with acetone, heating in 3% ammonia solution for 15 minutes followed by washing with distilled water and acetone and drying in a vacuum oven at 70° C., a product was obtained which had an inherent viscosity of 1.21.

EXAMPLE 4

A mixture of 30 g. dioxolan and 0.9 g. trioxan was stirred rapidly whilst 0.003 g. nitrosyl hexafluoroantimonate (as a 25% solution in nitroethane) was injected into the solution maintained at 20° C. The mixture was then closed to the atmosphere. Onset of polymerisation was marked by an increase in viscosity of the mixture and was visible within a time of 1 hour. Polymer began to crystallise out after a further time of 2 hours.

After 16 hours the polymer was broken up and milled in acetone. The slurry so formed was filtered and the polymer homogenised with acetone and dried under vacuum at room temperature. A yield of 52% polymer was obtained, which had a melting point of 51–52° C.

EXAMPLE 5

A similar experiment to Example 4 was conducted using 30 g. dioxolan, 0.9 g. indene, 60 g. cyclohexane and 0.009 g. nitrosyl hexafluoroantimonate as catalyst. Polymerisation was stopped after 14 days and the polymer was recovered and treated as in Example 4. The polymer had a melting point of 56–57° C.

EXAMPLE 6

A similar experiment to Example 4 was conducted using 30 g. dioxolan, 0.9 g. isoprene and 0.003 g. nitryl hexafluoroantimonate as catalyst. Polymerisation was stopped after 14 days and the polymer was recovered and treated as in Example 4 to give a 62% yield. The polymer had a melting point of 46–47° C.

EXAMPLE 7

10 g. dry redistilled dioxolan and 0.01 g. iodonium hexafluoroantimonate, added as a 4% solution in nitromethane, were agitated together at room temperature for 1½ hours. The polymerisation was then terminated by the addition of a little acetone, and the polymer was filtered off, washed in more acetone, and dried in a vacuum oven. 7 grams (70% theoretical) of a polymer having a melting point between 55 and 61° C. were obtained.

What is claimed is:

1. A process for polymerising a cyclic acetal selected from the class consisting of trioxan, tetroxan, 1,3-dioxolan, 1,3,5-trioxepan and 1,3-dioxepan, comprising effecting the polymerisation under substantially anhydrous conditions in the presence of a catalyst selected from the class consisting of iodonium, nitryl and nitrosyl hexafluoroantimonates.

2. A process for the polymerisation of trioxan which comprises effecting the polymerisation under substantially anhydrous conditions and at a temperature between −100° C. and 150° C. in the presence of a catalyst selected from nitryl and nitrosyl hexafluoroantimonates.

3. A process for the polymerisation of trioxan which comprises effecting the polymerisation under substantially anhydrous conditions and at a temperature between −100° C. and 150° C. in the presence of iodonium hexafluoroantimonate.

4. A process for polymerising tetroxan which comprises effecting the polymerisation under substantially anhydrous conditions and at a temperature between −100° C. and 150° C. in the presence of a catalyst selected from nitryl and nitrosyl hexafluoroantimonates.

5. A process for polymerising tetroxan which comprises effecting the polymerisation under substantially anhydrous conditions and at a temperature between −100° C. and 150° C. in the presence of iodonium hexafluoroantimonate.

6. A process for polymerising 1,3-dioxolan which comprises effecting the polymerisation under substantially anhydrous conditions and at a temperature between −100° C. and 150° C. in the presence of a catalyst selected from nitryl and nitrosyl hexafluoroantimonates.

7. A process for polymerising 1,3-dioxolan which comprises effecting the polymerisation under substantially anhydrous conditions and at a temperature between −100° C. and 150° C. in the presence of iodonium hexafluoroantimonate.

8. A process for polymerising 1,3,5-trioxepan which comprises effecting the polymerisation under substantially anhydrous conditions and at a temperature between −100° C. and 150° C. in the presence of a catalyst selected from nitryl and nitrosyl hexafluoroantimonates.

9. A process for polymerising 1,3,5-trioxepan which comprises effecting the polymerisation under substantially anhydrous conditions and at a temperature between −100° C. and 150° C. in the presence of iodonium hexafluoroantimonate.

10. A process for polymerising 1,3-dioxepan which comprises effecting the polymerisation under substantially anhydrous conditions and at a temperature below −100° C. and 150° C. in the presence of a catalyst selected from nitryl and nitrosyl hexafluoroantimonates.

11. A process for polymerising 1,3-dioxepan which comprises effecting the polymerisation under substantially anhydrous conditions and at a temperature between −100° C. and 150° C. in the presence of iodonium hexafluoroantimonate.

12. A process for polymerising a cyclic acetal selected from the class consisting of trioxan, tetroxan, 1,3-dioxolan, 1,3,5-trioxepan and 1,3-dioxepan, which comprises effecting the polymerisation under substantially anhydrous conditions, under bulk conditions, and in the presence of a catalyst selected from the class consisting of iodonium, nitryl and nitrosyl hexafluoroantimonates.

13. A process for polymerising a cyclic acetal selected from the class consisting of trioxan, tetroxan, 1,3-dioxolan, 1,3,5-trioxepan and 1,3-dioxepan, which comprises effecting the polymerisation under substantially anhydrous conditions, in the presence of an inert liquid medium, at a temperature between −100° C. and 150°

C., and in the presence of a catalyst selected from the class consisting of iodonium, nitryl and nitrosyl hexafluoroantimonates.

14. A process according to claim 13 wherein the cyclic acetal is in solution in an inert liquid medium and the catalyst is added in solution in a different inert liquid medium.

15. A process according to claim 14 wherein the cyclic acetal is dissolved in cyclohexane and the catalyst is added in solution in nitroethane.

16. A process for preparing a copolymer which consists essentially in stirring together trioxan and vinyl acetate in cyclohexane at 60° C., adding thereto a catalytic amount of nitryl hexafluoroantimonate in nitroethane, and recovering the resulting polymer.

17. A process for preparing a copolymer which consists essentially in stirring together trioxan and styrene in cyclohexane at 60° C., adding thereto a catalytic amount of nitryl hexafluoroantimonate in nitroethane, and recovering the resulting polymer.

18. A process for preparing a copolymer which consists essentially in vigorously agitating a mixture of trioxan and cyclohexane at 60° C., adding styrene thereto followed by a catalytic amount of iodonium hexafluoroantimonate in nitropropane, and recovering the resulting polymer.

19. A process for preparing a copolymer which consists esentially in stirring rapidly a mixture of dioxolan and trioxan, introducing thereinto a catalytic amount of nitrosyl hexafluoroantimonate at about 20° C., closing the mixture to atmosphere, and recovering the resulting polymer.

20. A process for preparing a copolymer which consists essentially in stirring rapidly a mixture of dioxolan, indene and cyclohexane, adding thereto a catalytic amount of nitrosyl hexafluoroantimonate at about 20° C., closing the mixture to atmosphere, and recovering the resulting polymer.

21. A process for preparing a copolymer which consists essentially in stirring rapidly a mixture of dioxolan, and isoprene, adding thereto a catalytic amount of nitryl hexafluoroantimonate at about 20° C., closing the mixture to atmosphere, and recovering the resulting polymer.

22. A process for polymerising dioxolan which consists essentially in agitating together at room temperature dry redistilled dioxolan and a catalytic amount of iodonium hexafluoroantimonate in nitromethane, terminating the polymerisation by addition of acetone, and recovering the resulting polymer.

References Cited
UNITED STATES PATENTS

| | | |
|---|---|---|
| 3,219,631 | 11/1965 | Kullmar et al. |
| 3,296,210 | 1/1967 | Wilson et al. _____ 260—73 |

WILLIAM H. SHORT, *Primary Examiner.*

L. M. PHYNES, *Assistant Examiner.*

U.S. Cl. X.R.

260—67, 73, 93.5, 94.3

Disclaimer 3,422,035.—*Herbert May*, Oldbury, near Birmingham, *Brian John Kendall-Smith*, Birmingham, and *Susannah Burr*, Camargue, Welland, England. PROCESS FOR POLYMERIZING CYCLIC ACETALS. Patent dated Jan. 14, 1969. Disclaimer filed Feb. 24, 1969, by the assignee, *British Industrial Plastics Limited*.

Hereby disclaims the terminal portion of the term of said patent subsequent to Apr. 23, 1985.

[*Official Gazette June 3, 1969.*]